(12) United States Patent
Shibazaki et al.

(10) Patent No.: US 6,476,891 B1
(45) Date of Patent: Nov. 5, 2002

(54) REFLECTIVE LIQUID CRYSTAL DISPLAY APPARATUS

(75) Inventors: Minoru Shibazaki; Tatsuo Uchida, both of Sendai (JP)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 09/743,657

(22) PCT Filed: May 12, 2000

(86) PCT No.: PCT/EP00/04603

§ 371 (c)(1),
(2), (4) Date: Jan. 12, 2001

(87) PCT Pub. No.: WO00/70393

PCT Pub. Date: Nov. 23, 2000

(30) Foreign Application Priority Data

May 14, 1999 (JP) ............................................ 99-134985

(51) Int. Cl.[7] ............................................ G02F 1/1335
(52) U.S. Cl ........................ 349/117; 349/113; 349/118; 349/121
(58) Field of Search ............................... 349/112, 113, 349/117, 118, 119, 121; 345/50

(56) References Cited

U.S. PATENT DOCUMENTS 5,523,867 A * 6/1996 Akatsuka et al. ........... 349/110
6,147,734 A * 11/2000 Kashima ..................... 349/113
6,208,415 B1 * 3/2001 De Boer et al. ............ 356/491
6,229,587 B1 * 5/2001 Ozeki et al. ................. 345/50

* cited by examiner

*Primary Examiner*—William L. Sikes
*Assistant Examiner*—Tarifur R. Chowdhury
(74) *Attorney, Agent, or Firm*—Aaron Waxler

(57) ABSTRACT

It is an object to provide a reflective LCD apparatus to obtain a wider view angle and a desired black view. A reflective LCD apparatus according to the invention comprises a phase difference film (retardation film), a liquid crystal layer and a reflector for reflecting incident light. The reflective LCD apparatus suffices in a plurality of Stokes parameter points of said reflected light are plotted on a approximately straight line on a Poincare sphere, indicative of light polarization state by said liquid crystal layer, sighted in a plane cross section, and the relation between said liquid crystal layer and said phase difference film with respect to said reflected light substantially satisfies:

$cRet(\lambda)=\lambda\theta(\lambda)$ wherein Ret ($\lambda$) represents retardation with respect to light having a wavelength of $\lambda$ in said phase difference film; when the respective Stokes parameter points of said reflected light are projected on a plane parallel to the plane including an origin of said Poincare sphere and the Stokes parameter points of said reflected light, $\theta(\lambda)$ represents an angle between the respective projected points and an axis vertical to said plane cross sectional sight of said Poincare sphere including said origin point; and c represents a constant.

7 Claims, 3 Drawing Sheets

REFLECTIVE LIQUID CRYSTAL DISPLAY APPARATUS

FIELD OF THE INVENTION

This invention pertains to a reflective liquid crystal display device that has a phase difference film and a liquid crystal layer and a reflecting sheet, wherein the above mentioned incident light is reflected by the above mentioned reflecting sheet, and the reflected light passes through the above mentioned liquid crystal layer and the above mentioned phase difference film.

BACKGROUND OF THE INVENTION

Existing Technology

Because reflective liquid crystal display devices keep a high luminance, even outdoors, and backlight is not necessary, they are desirable from the viewpoint of low (electric) power consumption, and in recent years development has been advancing.

An example of such reflective liquid crystal display devices is a device wherein a reflective function has been given to the pixel electrodes themselves. This device has 1 polarizing sheet and at least 2 sheets of phase difference film and a liquid crystal layer and pixel electrodes that have the function of a reflecting sheet. These at least 2 sheets of phase difference film have the functions mentioned below.

FIG. 9 shows the correlation of the voltage that is applied to the liquid crystal layer and the reflectance of the liquid crystal layer. Herein the reflectance is the proportion of the quantity of light that is obtained when linearly polarized incident light has been incident on the phase difference film and liquid crystal layer, has been reflected by the reflecting sheet, has left the said liquid crystal layer and said phase difference film again and thereafter has again passed through the polarizing sheet, when the quantity of the above mentioned incident light that has been linearly polarized after having passed through the above mentioned polarizing sheet, is set at 100. Graph 1 is the case wherein these at least 2 sheets of phase difference film are not present. When a high voltage is applied to the liquid crystal layer, almost 100% of the incident light is reflected, and sufficient white can be displayed. Since at the low voltage side, however, the reflectance does not drop to 0%, the black luminance is floating. By the fact that herein the ideal ¼λ sheet is formed with the use of at least 2 sheets of phase difference film, the white characteristics turn black, and on the other hand, the black characteristics turn white, viz, the low voltage side was made white. Graph 2 is the case wherein at least 2 sheets of phase difference film were used and turned into the ideal ¼λ sheet, and the reflectance at the high voltage side is almost 0%, viz., a sufficient black level is obtained.

In order to form the ideal ¼λ sheet, however, at least 2 sheets of phase difference film were necessary in such existing reflective liquid crystal display devices. Moreover, because a sufficient white level was not obtained, even if a sufficient black level had been obtained, the contrast was low. Moreover, by the angle under which the reflective liquid crystal display device is observed, it had the unfavourable situation that the black luminance was floating, and that the white luminance became dark. Moreover, it had The unfavourable situation that even in the case that colour image is displayed, the colour changes, depending on the characteristics of the angle of vision.

SUMMARY OF THE INVENTION

Problems that Should be Solved by the Invention

This invention has the aim to offer a reflective liquid crystal display device with a high contrast, wherein floating of the black luminance is prevented. Moreover, this invention has the aim to offer a reflective liquid crystal display device That has sufficient wide angle of vision characteristics.

Means to Solve the Problems

The reflective liquid crystal display device of this invention has the characteristic feature that it is the reflective liquid crystal device that has been described in claim 1.

The inventors of the present application discovered that the cause of floating of black luminance is the fact that, de-pending on the wavelength, the light after reflection of incident light and passage through the liquid crystal layer and the phase difference film, has not become linearly polarized light. The reason is that, because only the quantity that has slipped away from the linearly polarized light passes through the polarizing sheet, even if a voltage is applied to the liquid crystals and the polarization plane of the light is changed, it is no longer converted to a black display. The inventors of the present application discovered the conditions of the phase difference film and the conditions of the liquid crystal layer as conditions to turn light, after passage through the phase difference film, into linearly polarized light. Below, this is explained.

Because in the case of a reflective liquid crystal display device, the angle of the incident light in the reflecting sheet and the angle of the reflected light are equal, the effect of auto-compensation is obtained with respect to the angle of the incident light. Consequently, it is sufficient to observe either the process from the incidence of light in the reflective liquid crystal display device until it has arrived in the reflecting sheet, or the process from reflection by the reflecting sheet until the light has arrived at the said reflective liquid crystal display device. In this application, the latter is observed, as shown below.

In reflective liquid crystal display devices, light that has been incident is linearly polarized by the fact that it passes through a polarizing sheet. In order to obtain a black display in the reflective liquid crystal display device, based on this incident light, it is necessary that the above mentioned linearly polarized light that has been incident, becomes circularly polarized light on the reflecting sheet, and again becomes linearly polarized light after having left the phase difference film. The reason is that the direction of polarization of the reflected light has to perpendicularly cross the optical axis of the above mentioned polarizing sheet. Here, the state of polarization in the case that the circularly polarized light from the reflecting sheet has been incident on the liquid crystal layer, and has left the said liquid crystal layer, is considered.

In the case that the state of polarization is observed, in general a Poincare sphere and Stokes parameters are used. The Poincare sphere is a spherical surface that displays the state of polarization, corresponding to a point on a spherical surface whereof the radius is proportional to the strength. The Stokes parameters are the 4 parameters $S0$, $S1$, $S2$ and $S3$, that present the state of polarization, also including partial polarization. $S0$ presents the strength of the partial polarization, and $S1$, $S2$ and $S3$ are 3-dimensional components in the case that the polarization has been displayed with a Poincare sphere, and they coincide with The x, y and z components. With the state of polarization as a point on this Poincare sphere, the state of polarization can be presented with the use of Stokes parameters $S1$, $S2$ and $S3$. Below, this point is called the Stokes parameter point.

It is an object to provide a reflective LCD apparatus to obtain a wider view angle and a desired black- view. A reflective LCD apparatus according to the invention comprises a phase difference film (retardation film), a liquid crystal layer and a reflector for reflecting incident light. The reflective LCD apparatus suffices in a plurality of Stokes parameter points of said reflected light are plotted on a approximately straight line on a Poincare sphere, indicative of light polarization state by said liquid crystal layer, sighted in a plane cross section, and the relation between sad liquid crystal layer and said phase difference film with respect to said reflected light substantially satisfies:

$cRet(\lambda)=\lambda\theta(\lambda)$.

The state of polarization of the light that includes in the liquid crystal layer is observed with the Poincare sphere. FIG. 1 shows the S1–S2 plane that appears when the Poincare sphere is viewed as a plane in some cross section. By manufacture with selection of the twist angle of the liquid crystal layer and the size of the retardation of the liquid crystal layer, the Stokes parameter points of the reflected light after passage through the liquid crystal layer can, as is shown in the figure, almost be mounted on a straight line for all wavelengths of the visible light, in the S1–S2 plane. The points •, ▲ and ■ on this straight line, for instance, present the Stokes parameter points that pertain to red green and blue reflected fight. For thus mounting them almost on a straight line, it is for instance understood that the twist angle of the liquid crystal layer is in the range from 30° to 70°, and that the size of the retardation for light with a wavelength of 550 nm, is preferably the range from 100 or more to 350 nm or less.

In the S3–S4 plane that is parallel to the plane that includes the crossing point of axis S1 and axis S2 on the S1–S2 plane, which is also the point of origin of the Poincare sphere, and includes a number of Stokes parameter points of the above mentioned reflected light, the respective Stokes parameter points of above mentioned reflected light are projected. FIG. 2 shows this S3–S4 plane, and this S3–S4 plane is the plane wherein the Stokes parameter points are viewed from the arrow A in FIG. 1 in the direction of the point of origin. Here, axis S4 in the S3–S4 plane is an axis that perpendicularly crosses axis S1 and axis S2, and axis S3 in the S3–S4 plane is the axis that perpendicularly crosses the said axis S4. The angle that is formed by the respective projection points of the number of Stokes parameter points of the above mentioned reflected light on the S3–S4 plane, and axis S4 is $\theta(\lambda)$. Here, $\lambda$ shows the wavelength of the reflected light.

The phase difference film is made in such a way that it satisfies the formula mentioned below, $$cRet(\lambda)=\lambda\theta(\lambda) \quad (1)$$

Herein, c is a constant, and $Ret(\lambda)$ is the size of the retardation of the phase difference film with respect to light with wavelength $\lambda$. When the phase difference film is made in such a way that it satisfies above mentioned formula (1), the reflected light that has passed through the liquid crystal layer and the phase difference film, becomes linearly polarized light. The reason is that all Stokes parameter points that are shown in FIG. 2, when it has passed through the liquid crystal layer, are mounted on axis S4 of FIG. 2 when it has passed through the phase difference film. In other words, the angle $\theta(\lambda)$ after passage through the liquid crystal layer can be presented as $$\theta(\lambda)=c\frac{Ret(\lambda)}{\lambda} \quad (2)$$

and the reason is that the Stokes parameter points move with just this. angle $\theta(\lambda)$ after passage through the phase difference film and come to be mounted on axis S4 of FIG. 2.

In the case of a reflective liquid crystal display device that has a liquid crystal layer and phase difference film that satisfy the above mentioned conditions, the reflected light after passage through the phase difference film becomes linearly polarized light, irrespective of the wavelength $\lambda$. Consequently, a reflective liquid crystal display device with a complete black luminance and a high contrast is obtained.

The present inventors also discovered the conditions of the liquid crystal layer and the phase difference film in order to obtain a reflective liquid crystal display device with a wide angle of the field of vision. Here, the angle of the field of vision is the angle that is formed by the plane that perpendicularly crosses the liquid crystal display device, through the center of the said liquid crystal display device, and the plane through the above mentioned center of the above mentioned liquid crystal display device and the observer.

First, the characteristic conditions of the phase difference film are described below, Because the usual phase difference film for instance a stretched film, has no optical rotation properties, the retardation $Ret(\lambda)$ of the phase difference film sheet when reflected light has been incident on the phase difference film and then has left the said phase difference film is presented as the function of field of vision angle $\phi$, as is shown below.

$$Ret(\lambda)=\frac{2\pi d}{\lambda}\left\{\frac{n_y}{n_z}(n_x^2-\sin^2\psi)^{\frac{1}{2}}_2-(n_x^2-\sin^2\psi)^{\frac{1}{2}}_2\right\} \quad (3)$$

Herein, nx, ny and nz respectively present the refractive indices in x, y and z directions, and the angle of the field of vision $\phi$ is the angle that is formed by the plane through the center of the liquid crystal display device that perpendicularly crosses the plane of the said liquid crystal display device, and the plane though the above mentioned center of the above mentioned liquid crystal display device and The observer. Here, the conditions of a wide field of vision angle are that retardation $Ret(\lambda)$ is constant, even when field of vision angle $\phi$ changes. This condition is satisfied by selection of such a refractive index of the phase difference film that the below mentioned formula is roughly satisfied.

$$n_z=\frac{n_x+n_y}{2} \quad (4)$$

Because the size of the retardation is constant, irrespective of the angle of the field of vision from which it is viewed, when a phase difference film that satisfies the refractive index of these conditions, is used, the reflectance of light that has passed through the phase difference film, does not change, depending on the angle of the field of vision. In addition to satisfying the above mentioned conditions of the refractive index, the desired size for the size of the retardation of the phase difference film can be obtained by adjusting the thickness of the said phase difference film.

Subsequently, the liquid crystal layer is explained. Also for the liquid crystal layer, equivalently satisfying above mentioned formula (4), is a condition for a wide field of vision angle. When optical rotation is considered, a condition for satisfying these conditions is that the twist angle is small and that the size of the retardation is small. It was for instance understood that it is preferred that the twist angle of the liquid crystal layer is in the range from 30° to 70°, and that the size of the retardation for light with a wavelength of 550 nm is in the range from 100 or more to 350 nm or less. That is to say that it was understood that the characteristics of the liquid crystal layer for being a wide field of vision angle, and the characteristics of the liquid crystal layer for mounting of the above mentioned Stokes parameters on a substantially straight line are about the same.

Since in the reflective liquid crystal display device of this invention not only the phase difference film, but also the liquid crystal layer have the characteristics of a wide field of vision angle, as a whole an image display with an almost constant reflectance in the range of a wide field of vision angle is obtained. Moreover, because a phase difference film and liquid crystal layer that satisfy not only above mentioned formula (4) but also above mentioned formula (1), are used, the reflectance is almost constant with a wide field of vision angle and not depending on the wavelength.

As has been discussed above, the present inventors discovered that it is possible to design a phase difference film and a liquid crystal layer that have wide field of vision angle, without floating of black luminance. Below, details are described in an example of embodiment.

DETAILED DESCRIPTION OF THE PRIMARY EMBODIMENT

Example of Embodiment

FIG. 3 is a cross section of the reflective liquid crystal display device of this invention, that has front scattering diffusion sheet 21, polarizing sheet 11, phase difference film 22, and liquid crystal layer 9 between common electrode substrate 5 and TFT array substrate 1. TFT array substrate 1 has TFT (thin film transistors) 3 that correspond with the respective pixels, and pixel electrodes 4 that are arranged in the form of a matrix, on glass substrate 2. These TFT 3 are covered by insulating layer 23, and the above mentioned pixel electrodes 4 are respectively connected with the drains of the respective TFT, via contact holes. These pixel electrodes 4 are such pixel electrodes of metal, that the above mentioned insulating layer 23 is almost covered, and hereby, it also has a function as a reflecting sheet. Common electrode substrate 5 has transparent common electrode 8 on glass substrate 6.

The light that has been incident on the liquid crystal display device is incident on the phase difference film via front scattering diffusion sheet 21 and polarization sheet 11. By polarization sheet 11, the incident light, that is natural light, is linearly polarized The incident light that has been linearly polarized, is incident on liquid crystal layer 9 via common electrode substrate 5, and the plane of polarization is revolved, based on the voltage of the pixel electrodes that has been controlled by the respective TFT, and it is reflected by pixel electrodes 4 as a reflecting sheet. The reflected light again passes through liquid crystal layer 9, and the plane of polarization is revolved, and it passes through phase difference film 22 arid polarization sheet 11 etc., in the order that is opposite to that in the case of incidence.

This liquid crystal layer 9 was manufactured under conditions of design as mentioned below. As the material of the liquid crystal layer, type name 'HS-5043' made by Chisso Co., Ltd. was used. It was produced in such a way that the rubbing direction of this liquid crystal layer at the side of common electrode substrate 5 is 0°, and the rubbing direction at the side of TFT array substrate 1 is 125°, and that the size of the retardation for light with a wavelength of 550 nm is 230 nm. With light of a single wavelength, the intensity (strength) of the transmitted light against light that has come to be reflected by incidence of circularly polarized light in this liquid crystal layer, was determined with the use of a polarization microscope. For light with a number of wavelength, it was observed by determination of the intensity of the reflected light, that, with respect to this liquid crystal layer, the number of Stokes parameter points on the Poincare sphere have been mounted almost on a straight line.

On the other hand, phase difference film 22 was produced under design conditions as mentioned below. As the material of phase difference film 22), polycarbonate was used, and the size of the retardation for light with a wavelength of 550 nm was 137.5 nm, and the refractive index was set at nx=1.576, ny=1.575 and nz=1.5755. The thickness of the phase difference film was 335 nm, and the axis of the retarded phase was 83°. The wavelength diffusion $D(\lambda)$ of the phase difference film was designed in such a way that the formula mentioned below is satisfied.

$$D(\lambda) = 9.077 \times 10^{-1} + \frac{2.157 \times 10^4}{\lambda^2} + \frac{1.927 \times 10^9}{\lambda^4} \qquad (5)$$

Herein, the wavelength diffusion $D(\lambda)$ was one wherein the size of the retardation $Ret(\lambda)$ of the phase difference film to light with a wavelength of $\lambda$ had been divided by the size of the retardation $Ret(550)$ of the phase difference film for light with a wavelength of 550 nm, viz., had been regularized by $Ret(550)$. In the case that the phase difference film has mainly polycarbonate as the main material, satisfaction of this formula (5) is a design condition to satisfy above mentioned formula (1). The transmission axis of polarization sheet 11 has been designed at −20°.

FIG. 4 shows the field of vision characteristics of this phase difference film. The horizontal axis is the field of vision angle that has been defined as mentioned above, and the vertical axis shows the reflectance. Phase difference film 22 satisfies above mentioned formula (4). As is clear from FIG. 4, it appears that the reflectance is almost constant, even if the field of vision fluctuates in a wide range.

FIG. 5 shows the characteristics of the angle of vision of this liquid crystal layer 9. As is clear from the figure, it appears that the reflectance is almost constant, even if the field of vision fluctuates in a wide range.

FIG. 6 shows the characteristics of the angle of vision of the liquid crystal display device that has these phase difference film 2 and liquid crystal layer 9, when the voltage that is applied to the liquid crystal layer 5, is split into 5 levels. It appears that the reflectance is almost constant over a wide range of fields of vision.

FIG. 7 shows the correlation of the voltage that is applied to liquid crystal layer 9, and the reflectance of the liquid crystal display device of this invention. As is clear from the figure, it appears that when a high voltage is applied to the liquid crystal layer, the incident light is almost 100% reflected, and a sufficient white display is possible, and that, when a low voltage is applied, the reflectance is almost 0%, and sufficient black display is possible.

FIG. 8 shows the changes of the reflectance against the wavelength of the light, splitting the voltage that is applied to liquid crystal layer 9 into 5 levels. As is clear from the figure, it appears that the reflectance is almost constant, even if the wavelength changes. Consequently, it appears that the above mentioned formula (1) is almost satisfied.

In another good example of embodiment of this invention, polyacrylate is used as the material of The liquid crystal layer. In This case, it appeared that above mentioned formula (1) is almost satisfied if wavelength diffusion D(λ) of the phase difference film is designed in such a way that the formula mentioned below is satisfied.

$$D(\lambda) = 8.222 \times 10^{-1} + \frac{5.617 \times 10^4}{\lambda^2} + \frac{1}{\lambda^4} \quad (6)$$

In again another good example of execution of this invention, polysulfone has been used as the material of the liquid crystal layer. In this case, it appeared that above mentioned formula (1) is almost satisfied if wavelength diffusion D(λ) of the phase difference film is designed in such a way that the formula mentioned below is satisfied.

$$D(\lambda) = 7.503 \times 10^{-1} + \frac{8.046 \times 10^4}{\lambda^2} + \frac{1}{\lambda^4} \quad (7)$$

In again another good example of embodiment of this invention, norbornane has been used as the material of the liquid crystal layer. In this case, it appeared that above mentioned formula (1) is almost satisfied if wavelength diffusion D(λ) of the phase difference film is designed in such a way that the formula mentioned below is satisfied.

$$D(\lambda) = 9.695 \times 10^{-1} + \frac{9.500 \times 10^3}{\lambda^2} + \frac{1}{\lambda^4} \quad (8)$$

Results of the Invention

With the reflective liquid crystal display device of this invention, angle of vision properties are greatly improved, and an image display with a black luminance that does not float, is obtained.

Explanation of the Symbols

Figure 1:
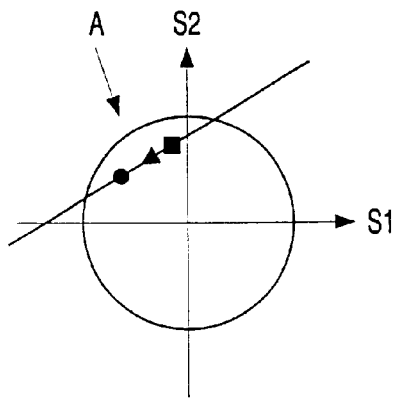
FIG. 1 is a figure of the S1–S2 plane when the Poincare sphere of the liquid crystal layer is viewed in a plane.
Figure 2:
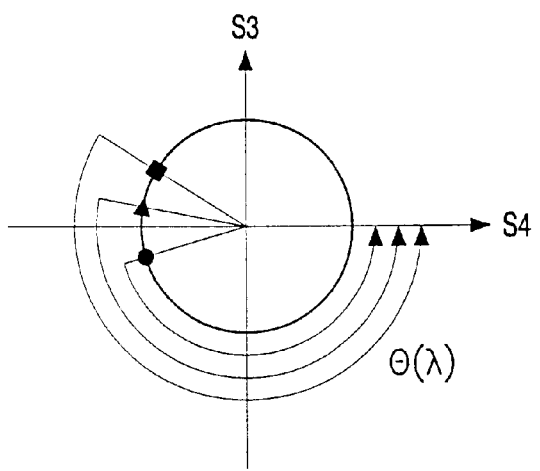
FIG. 2 is a figure of the S3–S4 plane when the Poincare sphere of the liquid crystal layer is viewed in a plane from another direction.
Figure 3:
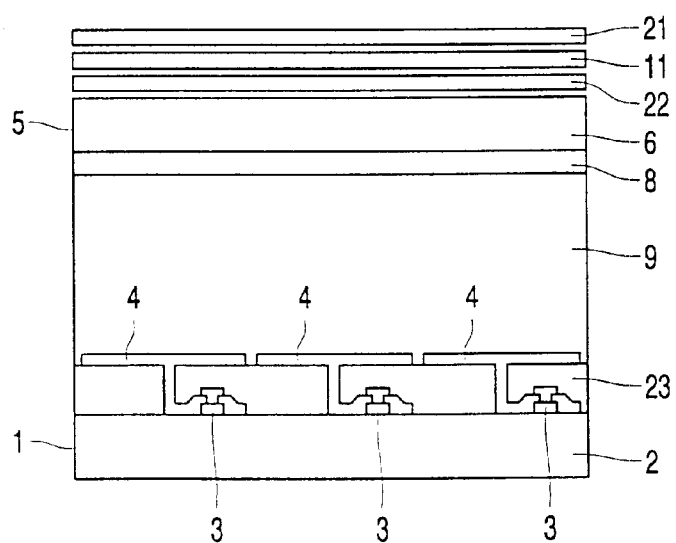
FIG. 3 is a cross section of the reflective liquid crystal display device of an example of execution of this invention.
Figure 4:
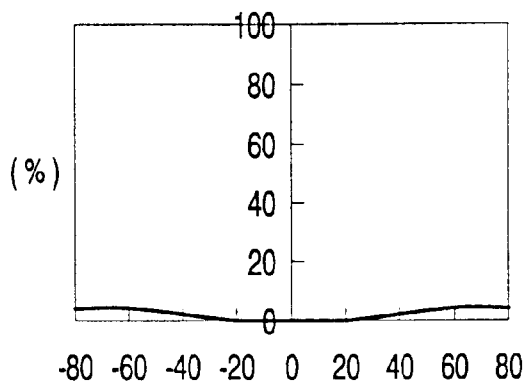
FIG. 4 shows the characteristics of the field of vision angle of the phase difference film of an example of execution of this invention.
Figure 5:
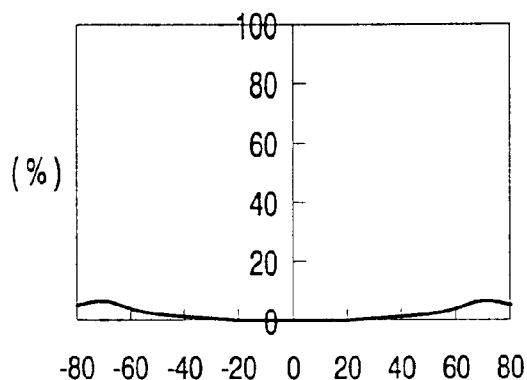
FIG. 5 shows the characteristics of the field of vision angle of the liquid crystal layer of an example of embodiment of this invention.
Figure 6:
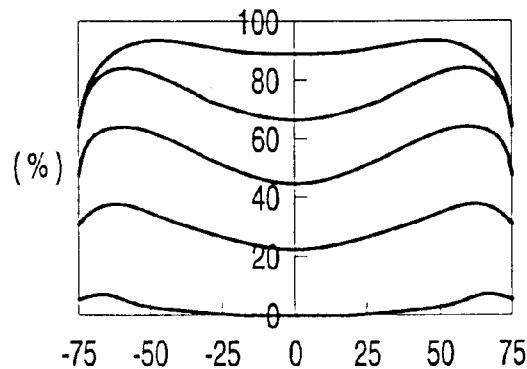
FIG. 6 shows the characteristics of the field of vision angle of the reflective liquid crystal display device of an example of embodiment of this invention.
Figure 7:
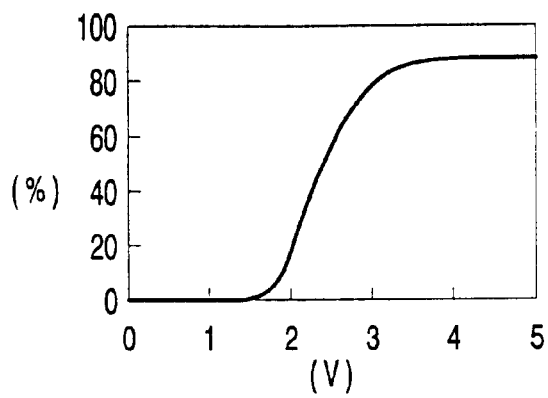
FIG. 7 shows the correlation of the voltage and the reflectance in the liquid crystal layer of the reflective liquid crystal display device of an example of embodiment of this invention.
Figure 8:
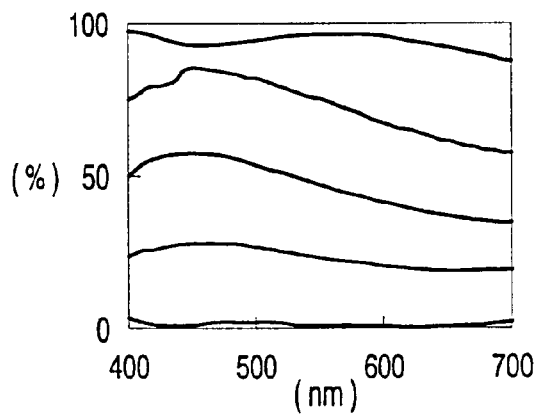
FIG. 8 shows the correlation of the wavelength of light that is incident on the reflective liquid crystal display device of an example of embodiment of this invention, and the reflectance.
Figure 9:
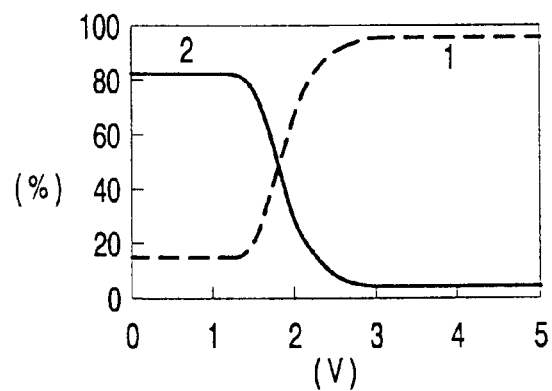
FIG. 9 shows the correlation of the voltage and the reflectance in the liquid crystal layer of an existing reflective liquid crystal display device.

1: TFT array substrate
2, 6: glass substrates
3: thin film transistor
4: pixel electrode
5: common electrode substrate
8: common electrode
9: liquid crystal layer
11: polarization sheet
21: front scattering diffusion sheet
22: phase difference film
23: insulating layer

What is claimed is:

1. A reflective liquid crystal apparatus comprising a phase difference film, a liquid crystal layer and a reflector for reflecting incident light, wherein said incident light is reflected by said reflector, and said reflected light passes through said liquid crystal layer and said phase difference film, and wherein a plurality of Stokes parameter points of said reflected light are plotted on an approximately straight line on a Poincare sphere, indicative of light in a plane cross section, and the relation between said liquid crystal layer and said phase difference film with respect to said reflected light substantially satisfied:

$cRet(\lambda) = \lambda\theta(\lambda)$ wherein Ret(λ) represents retardation with respect to light having a wavelength of λ in said phase difference film; when the respective Stokes parameter points of said reflected light are projected on a plane parallel to the plane including an origin point of said Poincare sphere and the Stokes parameter points of said reflected light, θ(λ) Represents an angle between the respective projected points and an axis vertical to said plane cross sectional sight of said Poincare sphere including said origin point; and c represents a constant.

2. The reflective liquid crystal display apparatus according to claim 1, wherein said phase difference film mainly comprises polycarbonate, and wherein the wavelength diffusion D(λ) of said phase difference film is defined by:

$$D(\lambda) = 9.077 \times 10^{-1} + \frac{2.157 \times 10^4}{\lambda^2} + \frac{1.927 \times 10^9}{\lambda^4}.$$

3. The reflective liquid crystal display apparatus according to claim 1, wherein said phase difference film mainly comprises polyarylate, and wherein the wavelength diffusion D(λ) of said phase difference film is defined by:

$$D(\lambda) = 8.222 \times 10^{-1} + \frac{5.617 \times 10^4}{\lambda^2} + \frac{1}{\lambda^4}.$$

4. The reflective liquid crystal display apparatus according to claim 1, wherein said phase difference film mainly comprises polysulfone, and wherein the wavelength diffusion Dλ of said phase difference film is defined by:

$$D(\lambda) = 7.503 \times 10^{-1} + \frac{8.046 \times 10^4}{\lambda^2} + \frac{1}{\lambda^4}.$$

5. The reflective liquid crystal display apparatus according to claim 1, wherein said phase difference film mainly comprises norbornane, and wherein the wavelength diffusion $D(\lambda)$ of said phase difference film is defined by:

$$D(\lambda) = 9.695 \times 10^{-1} + \frac{9.500 \times 10^3}{\lambda^2} + \frac{1}{\lambda^4}.$$

6. The reflective liquid crystal display apparatus according to claim 1, wherein said phase difference film and said liquid crystal layer substantially satisfy $$n_z = \frac{n_x + n_y}{2}$$

wherein nx, ny and nz respectively represent refractive indexes in x, y and z directions, and said x, y and z directions are respectively a lengthwise direction, a widthwise direction and a thickness direction of said phase difference film and said liquid crystal layer.

7. The reflective liquid crystal display apparatus according to claim 1, wherein the retardation with respect to light having a wavelength of 550 nm in said liquid crystal layer ranges from 100 nm to 350 nm, and wherein a twist angle of said liquid crystal layer ranges from 30° to 70°.

* * * * *